United States Patent [19]

Joh et al.

[11] 4,342,711

[45] Aug. 3, 1982

[54] METHOD OF MANUFACTURING HOLLOW FIBER

[75] Inventors: Yasushi Joh; Masahiro Yamazaki, both of Yokohama; Noriaki Kaneko, Kamakura; Shigehiko Oikawa, Sagamihara; Yoshihiro Makuta, Kawasaki; Chizuko Hayashi, Yokohama, all of Japan

[73] Assignee: Nippon Zeon Co., Ltd., Tokyo, Japan

[21] Appl. No.: 91,491

[22] Filed: Nov. 5, 1979

Related U.S. Application Data

[63] Continuation of Ser. No. 918,808, Jun. 26, 1978, abandoned.

[30] Foreign Application Priority Data

Jun. 30, 1977 [JP] Japan .................................. 52-78083

[51] Int. Cl.³ ............................................. B29D 27/00
[52] U.S. Cl. .................................... 264/41; 264/561; 264/177 F; 264/200; 264/209.1; 428/398
[58] Field of Search ................... 264/177 F, 561, 200, 264/41, 49, 209.1; 210/500.2; 428/398

[56] References Cited

U.S. PATENT DOCUMENTS

| 3,871,950 | 3/1975 | Hashino et al. | 264/182 |
| 3,888,771 | 6/1975 | Isuge et al. | 264/199 |
| 4,035,459 | 7/1977 | Kesting | 264/49 |
| 4,051,300 | 4/1977 | Klein et al. | 264/49 |
| 4,127,625 | 11/1978 | Arisaka et al. | 264/28 |

FOREIGN PATENT DOCUMENTS

| 49-13424 | 2/1974 | Japan | 264/49 |
| 49-31912 | 3/1974 | Japan | 264/49 |
| 49-64573 | 6/1974 | Japan | 264/49 |
| 50-59518 | 5/1975 | Japan | 264/49 |

*Primary Examiner*—Jay H. Woo
*Attorney, Agent, or Firm*—Armstrong, Nikaido, Marmelstein & Kubovcik

[57] ABSTRACT

A method of manufacturing a hollow fiber includes the steps of:

extruding a spinning solution of high molecular weight compound dissolved into a solvent, from an annular slit; and simultaneously extruding a liquid consisting of at least one of the solvent and swelling liquid capable of swelling the high molecular weight compound from an orifice encircled by the annular slit.

19 Claims, No Drawings

METHOD OF MANUFACTURING HOLLOW FIBER

This is a continuation, of application Ser. No. 918,808, filed June 26, 1978 now abandoned.

BACKGROUND OF THE INVENTION

1. Field of the Invention

This invention relates to a method of manufacturing a hollow fiber, and more particularly to a method of manufacturing a hollow fiber having favorable selective permeability.

2. Description of the Prior Art

Recently, hollow fibers are widely used in various fields. A method of manufacturing a hollow fiber has been investigated in order to impart various performances to the hollow fibers.

Examples of the successful use of the hollow fibers are a hollow-fiber type artificial kidney, a hollow-fiber type module for reverse osmosis, a hollow-fiber type ultrafilteration module and a hollow-fiber type reverse-osmosis condenser.

The artificial kidney has been used for a patient suffering from renal failure. Metabolic waste such as urea and uric acid are selectively removed from the blood of the patient by the artificial kidney. A well-balanced ultrafiltrating property or dewatering property with the removable performances of other metabolic waste is required for the artificial kidney. The hollow-fiber is also used for reverse osmosis, for example, for desalting sea water. A good water-flux and rejecting property against salt are required for reverse osmosis. The hollow-fiber type module is also used for treating polluted water from a factory, or for producing sterile water. The hollow-fiber type reverse-osmosis condenser is also used for food industry, for condensing juice. This method is advantageous in view of minimum loss of vitamins during the condensation process and, because heat is not used in this method, it saves energy.

In using hollow fibers, a fluid to be treated flows through the hollow portions of the hollow fibers. Accordingly, a hollow portion should extend longitudinally through the whole length of each fiber. The membrane of the hollow fiber should not be even partially broken. Further, it is required that the thickness of the membrane of the hollow fiber be:(a) uniform over the fiber's whole length fiber and (b) as small as possible with sufficient mechanical strength.

A conventional method of manufacturing the hollow fiber has been that a spinning solution (dope) is extruded from an annular slit of a double pipe orifice, to form a sheath solution, and simultaneously, a gaseous or liquid fluid is extruded from the inner pipe of the double pipe orifice to form a core fluid. So far, the use of liquid as core fluid is superior to that of gaseous fluid for stable spinning. The core liquid known so far can be classified into two categories.

The first one is a liquid having no compatibility with a spinning solution (sheath solution). For example, a cuprammonium solution of a cellulose is extruded as a sheath solution from the double pipe orifice, and simultaneously an organic solvent having no compatibility with water is extruded as a core solution from the inner pipe orifice (Japanese Patent Opening Nos. 40168/1975, 59518/1975 and 31912/1974). In these patents, the uses of octyl alcohol, benzene, toluene, styrene, light oil, kelosene, perchloroethylene, trichloroethylene, methyl-chloroform, and liquid paraffin are disclosed as core solution. The spun-dope filament is not miscible with the core solution, but the dope filament and core solution form separate phases. Thus, the mutual diffusion between the solvent of the sheath solution and the core solution is suppressed. Accordingly, gellation or coagulation of the spinning dope filament does not develope. For this reason, the spinnability is satisfactory and a high speed of spinning is possible. However, the above-described method has a disadvantage that it requires much labor and time to remove the core solution from the manufactured hollow fiber, and the removal of the core liquid from the hollow fiber is always imperfect, because the core solution is essentially incompatible with water. These inventors previously proposed a novel method of manufacturing hollow fiber in which an aqueous salt solution containing a sufficient amount of salt is used as core liquid, utilizing a phase separation between the core and sheath solutions due to salting-out effect (Japanese Patent Applications No. 77447/1976 and No. 143115/1976). This method is included in the first category in a sense of using a core solution which is incompatible with the sheath solution.

The above-described core liquid is often called "non-coagulating liquid". However, an essential point is that the core liquid is not compatible with a sheath liquid. In other words, a core liquid is separated from a sheath liquid, therefore, the mutual diffusion is suppressed. In a dry-jet-wet spinning process using the above-described method, the spun-dope filament runs through a gaseous space of an appropriate length before it is introduced into a coagulating both. The gellation of the spun filament is not developed by the core liquid in the passage that the filament is running through the gaseous space. Accordingly, the spinnability is excellent. Thus, the high speed spinning is possible without any trouble. Another method is proposed (Japanese Patent opening No. 132218/1975) in which the core solvent is essentially the same as the sheath solvent, but contains a water soluble polymer. The idea is that a polymer solution develops phase separation when different kinds of polymers are contained in the solution. Since the polymers in the core liquid and the sheath liquid are different, these solutions becomes imcompatible each other to form two separated phases. However, according to this method, it is very difficult to remove the core polymer from the manufactured hollow fiber. Accordingly, this method is practically impossible.

The second category is that water or an aqueous solution is used as the core liquid. The aqueous solution is usually a mixture of water and the solvent for the sheath solution. Diffusion rapidly occurs between the sheath solution and the core liquid. Since coagulating function of water is highly effective, the spun-dope filament is almost instantaneously gelled by the action of the core liquid immediately after being spun. Accordingly, the spinnability is very poor, and the draft ratio, which is the ratio of linear speed of spun-dope filament to take-up speed on a take-up roll, is also very small. Thus, the spinning speed is at most 5 to 15 meters per minute. However, the resultant hollow fiber has characteristic properties, for example, in selective permeability. The hollow fiber obtained by this method is known to be suitable for ultrafiltration. Hollow fibers from cellulose acetate, and vinyl halide (Japanese Patent Opening No. 80686/1976) and from acrylonitrile polymer (Japanese Patent Opening No. 6532/1974) are proposed using the above method.

When the above-described core liquid is used, the spinning speed is low as already described, because the spinning solution is rapidly gelled due to the rapid coagulating action of the core liquid. However, structure having high water-flux is imparted to the resultant hollow fiber, which is useful as a ultrafiltration membrane. A method to improve the spinning speed is proposed in the Japanese Patent Opening No. 13424/1974 in which the gellation of the spun solution of cuprammonium cellulose is suppressed by using chilled water as a core solution. It should be noted that such core solutions act to coagulate and gellate the spun filament.

SUMMARY OF THE INVENTION

Accordingly, it is an object of this invention to provide a method of manufacturing a hollow fiber by which a hollow fiber can be manufactured at high speed.

Another object of this invention is to provide a method of manufacturing a hollow fiber by which a uniform hollow fiber can be stably manufactured.

A further object of this invention is to provide a method of manufacturing a hollow fiber which can be used for various purposes.

In accordance with one aspect of this invention, a method of manufacturing a hollow fiber comprising the steps of: extruding a spinning solution of high molecular weight compound dissolved in a solvent, from an annular slit; and simultaneously extruding a core liquid comprising at least one of said solvents or a solvent for said high molecular weight compound and a swell liquid being able to swelling the high molecular weight compound from an orifice encircled by the annular slit.

Various other objects, advantages and features of the present invention will become readily apparent from the ensuing detailed description, and the novel features will be particularly pointed out in the appended claims.

DESCRIPTION OF THE PREFERRED EMBODIMENTS

According to one preferred embodiment, a cellulose ester dissolved in an organic solvent is extruded from the annular slit of the double pipe orifice, and simultaneously dimethyl sulfoxide (DMSO) or a liquid containing DMSO is extruded as core liquid from the inside pipe of the double pipe orifice.

In the method of the invention, there will be used a dry jet-wet spinning or wet spinning process. In the dry jet-wet spinning process, the spinning solution is initially extruded into a space, passed through the space of a predetermined length and then led into the coagulating bath. When a liquid having intensive coagulating action, for example, water is used as the core liquid in the dry jet-wet spinning, the gellation of the spinning solution extruded from the double pipe orifice is rapidly developed due to the intensive coagulating action of the core liquid. As the result, the spinnability is very poor, and a desirable draft cannot be obtained. The hollow fiber can be produced only at a low speed. On the contrary, the feature of this invention is that the core liquid is substantially the same as the solvent of the high molecular compound in the sheath solution, or is a liquid having swelling-action (swelling agent). According to this invention, the core liquid causes little or no coagulation and gellation of the spun filament.

These inventors have found that hollow fibers having a uniform cross section which is a true circle can be manufactured with excellent spinnability by using a core solution having solvent power or swelling power. For example, dimethylsulfoxide (DMSO, solvent for cellulose esters) or DMSO solution can be used as a core liquid to produce the cellulose ester hollow fiber by dry jet-wet spinning.

The reason for the successful result is considered as follows:

First, the spinning solution extruded from the annular slit has a high viscosity such as 200 to 2000 poises, because it is a high polymer solution. In the dry jet-wet spinning, the spinning filament runs naturally downward, since the spinning solution is extruded downward from the orifice substantially in the vertical direction.

Although the core liquid is compatible with the spinning solution, the core liquid itself has its inertia to flow down in the vertical direction, as long as there is no strong agitation. Thus, the core liquid cannot be mixed with the viscous spinning solution in a short time while the running dope filament passes through the gaseous space before being introduced into the coagulation bath. In the dry jet-wet spinning process, the dwell time of the running dope filament in the space before the coagulating bath is at most 0.01 sec. to 5.0 sec, and more particularly, 0.1 sec. to 0.3 sec. During such a short time, the core liquid flowing downward due to the inertia cannot be mixed with the viscous spinning solution flowing downward. The spun dope solution, involving the core liquid, is introduced into the coagulating bath, in a geometrical mode similar to that in which it was spun at the orifice.

In the above-described case, the percentage (by weight) of DMSO in the core liquid is normally more than 5%, preferably more than 10%, and more preferably more than 25%.

In the method of manufacturing the hollow fiber according to this invention, the spinning solution is not gelled during the dry-passage in the space. For this reason, the spinnability is excellent and the draft ratio can be surprisingly high. Thus, the hollow fiber can be stably manufactured at high speed.

Immediately after the spun dope filament is introduced into the coagulating bath, coagulation starts by the action of the coagulating liquid, for example, water. The coagulating liquid (water) penetrates into the hollow fiber membrane from its external surface to form a structure having desired permeability. During the coagulating process, the core solvent in the hollow portion is rapidly substituted by water (coagulating liquid), reducing the solubility of the core solution. Thus, the coagulated hollow fiber can be stably taken up on a take-up roll.

In the dry jet-wet spinning, the dry-passage before the coagulation bath is normally 5 mm to 100 cm. Of course, it may be more, for example, 6 m to 10 m.

This invention may be applied to the usual wet-spinning process in which the orifice is immersed in the coagulating bath. The spun filament from the double pipe orifice immediately contacts the coagulating liquid. Accordingly, the spun dope is immediately gelled, and therefore, the spinning speed is lower than that for dry jet-wet spinning. However, the spinning speed is higher than that in the conventional method. The reason is presumably that the solvent or swelling agent in the core liquid infiltrates into the hollow fiber membrane from its interior while gellation occurs from its exterior and so degree of the gellation is suppressed to some extent, so as to effect the better spinnability.

Natural high polymers, modified natural polymers and synthetic polymers may be used for this invention. All high polymers which can be dissolved into a solvent to form a spinning solution may be used for this invention. Examples of the natural polymers are cellulose and collagen. As the examples of the modified natural polymer, there will be enumerated cellulose esters such as cellulose acetate, cellulose butyrate, cellulose propionate, cellulose acetate butyrate and cellulose acetate propionate. The hollow fiber of cellulose ester can be converted to a cellulose hollow fiber by hydrolysis. As the examples of the synthetic high polymer, there will be enumerated polyacrylonitrile, acrylonitrile copolymer having at least 60% by weight of acrylonitrile, (The copolymerizable monomers with acrylonitrile are, for example, vinyl acetate, methyl acrylate, ethyl acrylate, methyl methacrylate, vinylpyridine vinylbenze sulfonic acid, styrene, and any other copolymerizable vinyl monomer with acrylonitrile), polymethyl methacrylate, polyvinyl chloride, nylon, polysulfone, polycarbonate and synthetic polypeptide.

Any solvent into which the above-described high polymer can be dissolved to form spinning solution may be used for this invention. For example, dimethylsulfoxide containing paraformaldehyde can be used for cellulose. For cellulose acetate, acetone, methyl Cellosolve acetate dimethylsulfoxide, dimethylformamide, dimethyl acetamide, methylene chloride methyleacetate, nitromethane, 1,4-dioxane, diacetone alcohol, ethyl lactate, methylene dichloride, methyl ethyl ketone, tetrahydrofuran, ethylformamide and methyl formate can be used. The above solvent can be used alone, or in the form of mixture, for example, acetone-methanole (80:20), methylenechloride-methanol (80:20), methylenechloride-ethanol (90:10), ethylene dichloride-methanol (80:20), nitromethane-ethanol (80:20), ethylene dichloride-ethanol (90:10), nitropropane-ethanol (70:30). As for acrylonitrile polymers such as polyacrylonitrile or acrylonitrile copolymer, a strong polar aprotic organic solvent such as dimethylformamide, dimethylacetamide, dimethylsulfoxide and hexamethylphosphoramide can be used for the solvent of spinning solution. The solvent should not always be an organic solvent. Inorganic protic solvents such as concentrated aqueous solutions of nitric acid, sulfuric acid, perchloric acid can also be used for acrylonitrile polymer. The concentration of the acid must be sufficient for dissolving the acrylonitric polymer. For polymethylmethacrylate, acetone, toluene, acetic acid, formic acid, ethyl acetate, 1,2-dichloroethane can be used. And dimethylformamide, cyclohexanone, methyl cyclohexanone, nitrobenzene mesityl oxide, and tetrahydrofuran can be used as solvent for polyvinyl chloride. And cuprammonium aqueous solution can be used as core liquid when a cuprammonium solution of cellulose is the spinning solution.

When cellulose acetate is used in this invention, the degree of esterification of the cellulose acetate is normally required to be 30% to 65%. The concentration of cellulose ester in the spinning solution depends on the molecular weight of cellulose ester. Usually it ranges between 10 and 35%.

In the present invention, contrary to the general understanding in this field, the above described solvents for the spinning solution can also be used as the core liquid.

In addition, materials which are able to swell the polymer in the spinning solution may also be used as core liquid. For example, methyl ethyl ketone, ethyl acetate, Cellsolve acetate and methyl Cellosolve may be used as the swelling agent for cellulose acetate. Formamide, aqueous solutions of nitric acid and aqueous solutions of perchloric acid may be used as the swelling agent for polyacrylonitrile. A swelling agent which has "the degree of swelling" defined below can be used as core liquid:

The degree of swelling (SWD) is:

$$SWD = (Ws - Wo)/Wo \times 100,$$

wherein Wo represents the weight of the film sample of the polymer (5 cm × 5 cm square, 0.5 mm thickness) and Ws represents the weight of the film sample after immersed into the test liquid at 25° C. for 24 hours. Before determining the weight of the swollen film, the surface of the sample was lightly pressed with a filter paper to remove the liquid on the surface of the film. A swelling agent which has an SWD of 5 or more is normally used in this invention, however, the SWD is preferably more than 10, and more preferably more than 15. The swelling agent should not always be an organic material. It may be an aqueous solution containing an inorganic salt having sufficient swelling action, or an aqueous solution containing an organic swelling agent.

A core liquid containing both the above-described solvent and swelling agent may be used for this invention.

Another material may be added to the spinning solution in order to impart desirable selective permeability to the hollow fiber in accordance with the use purpose. This kind of additive is usually a material having a swelling effect on the polymer in the spinning solution. To distinguish the core liquid and this kind of additive to the spinning solution, both of which have the swelling effect, we shall use the word "dope additive" hereinafter as the additive for the spinning solution. Dope additives for cellulose acetate are, for example, dimethylsulfoxide, N,N-dimethylformamide, formamide, urea, triethyl phosphate, glyoxal, hydrogen perchlorate, N-methyl-2-pyrrolidone, t-buthanol and isopropanol diacetin, monoacetin, 1,3-butanediol. The inorganic dope additives are, for example, perchloric acid, salt of perchloric acid such as lithium perchlorate, sodium perchlorate, calcium perchlorate, aluminium perchlorate, lanthanum perchlorate, iron perchlorate, and ammonium perchlorate, and inorganic chloride such as zinc chloride, zinc bromide, zinc iodide, cadmium bromide, cadmium iodide, hydrogen iodide, sodium iodide, potassium iodide, magnesium iodide and aluminum iodide, sodium borate tetrafluoride (NaBF$_4$), tetraphenyl sodium borate (NaB(C$_6$H$_5$)$_4$), mercury (II) potassium iodide, ammonium phosphate hexafluoride, dihydroxyplatinum hexachloride, potassium thiocianate, sodium thiocianate, sodium salicylate and nitric acid.

The kind and amount of the dope additive may be determined in accordance with the required performance of the hollow fiber. Two or more kinds of the dope additive may be used, as occasion demands. The amount of the dope additive depends on the kind of the solvent of the spinning solution, the concentration of the polymer in the solution and the required performance of the hollow fiber. Accordingly, it cannot be generally determined. However, the amount of the organic dope additive may be normally 5 to 65%. The amounts of the inorganic dope additive in the spinning solution are different depending on whether the inorganic dope additive is used alone or with another material (for example, a saturated aqueous solution of inorganic dopeplus an additive such as a saturated aqueous urea solution). However, the amount of the inorganic additive is normally within the range of 1.0% to 30%. To the spinning solution, a non-solvent (for example, water, ethanol and methanol) may be added within the range in which the polymer can be dissolved into the solvent. The non-solute may change the solubility of the solvent which effects the dimensional configuration, and aggregation phenomena of the polymer molecules in the solution. This influences the coagulation behavior in the fiber-forming process and hence the permeability of the resultant hollow fiber.

As described in detail, the method according to this invention is new and superior to the conventional method in the point that a uniform hollow fiber can be stably manufactured at appreciable high speed. Moreover, the hollow fiber produced according to this invention has a good selective permeability. The important point of this invention consists of the fact that a solvent or swelling agent for the polymer is used as the core liquid. The core liquid in this invention plays an important role in giving a desired permeability to the resultant hollow fiber. To explain the characteristic feature of this invention, let us see the fiber.

To explain the forming process of cellulose acetate hollow fiber, taking up dimethylsulfoxide (DMSO) as core liquid. A mixture in which DMSO is one of the ingredients is used as core liquid. In this case, the percentage (by weight) of DMSO in the core liquid is normally more than 5%, preferably more than 10%, and more preferably more than 25%. In the coagulating bath, DMSO penetrates into the gelling hollow fiber membrane from the hollow portion of the hollow fiber. Needless to say, DMSO functions to swell the membrane effectively to form numerous micro pores communicated with each other in the membrane. When the organic or inorganic dope additive, which is usually a swelling agent for cellulose acetate, is previously added into the spinning solution the dope additive is removed out with the coagulating liquid (for example, with water) in the coagulating bath. However, according to this invention, DMSO infiltrates into the coagulating dope filament from the core liquid during the gellation so that the concentration of the swelling agent in the forming membrane is maintained at a relatively high concentration. This explains why the swelling agent has such a great influence on the resulting membrane structure of the hollow fiber.

In a coagulating process, the coagulating liquid such as water moves into the gelled membrane and then into the core liquid from the external surface. DMSO in the core liquid is thus diluted to reduce its solvent function. Since DMSO is freely mixed with water it can be easily washed out with water. When the produced hollow fiber is used in the medical field or in the food industry, it is very important that the core liquid can be easily removed from the hollow fiber by washing with water. This is one of the features of this invention.

According to this invention, water or an aqueous solution in which water is a major component is preferably used as the coagulating liquid. The aqueous solution in the coagulating bath may be a mixture of water and solvent for the spinning solution, water and dope additive or of water, dope additive and the solvent for the polymer. In the dry jet-wet spinning process, the amount of water in the coagulating bath is preferably more than 50% by volume. Normally, the hollow fiber coagulated in the cogulating bath is sequentially introduced into a waterwashing process. The coagulation is usually completed in the water-washing process.

The comprehensive idea presented in this invention is, of course, not limited to a specified polymer such as cellulose acetate, but can be applicable to any polymer which is able to dissolve in any solvent to produce a spinning solution. Examples are as follows:

Cuprammonium solution of cellulose as the spinning solution and cuprammonium aqueous solution as core liquid: a cellulose solution in dimethylsulfoxide-formaldehyde mixture as the spinning solution, and dimethylsulfoxide-formaldehyde mixture as core liquid; acrylonitrile polymer in dimethylformamide (DMF), dimethylacetamide (DMA), DMSO or hexamethylphosphoramide (HMPA) as spinning solution, and DMF, DMA, DMSO, HMPA or a mixtures of the above or solution containing the above as core liquid; polyvinylchloride in DMF, tetrahydrofuran (THF) or cyclohexanene as the spinning solution, and DMF, THF, and cyclohexanene, and solutions containing the above as core liquid, polymethyl methacrylate in acetone, 1,2 dichlorethane, acetic acid, formic acid, toluene, ethyl acetate for dope, the solvents above, and the solution of the above as core liquid.

As core liquid for acrylonitrilic copolymer, inorganic protic solvent such as an aqueous solution of nitric acid, perchloric acid, or surfuric acid, dichloracetic acid in which the water content is less than 70% can be also used as core liquid. These solvents can be, of course, used as the spinning dope.

For nylon, formic acid, phenol, and calcium chloride-methanol mixture may be used as spinning solution and core liquid, for a polypeptide such as poly-α-glutamic acid, dichloroacetic acid or m-cresol may be used for spinning solution and core liquid, for polysulfone, m-cresol, DMF, can be used for dope solvent and core liquid.

As core liquid, in addition to the solvent or its mixture the swelling agent for the spinning polymer can also be used as already described.

Examples of swelling agent as core liquid for cellulose acetate are methyl ethyl ketone, ethyl acetate, Cellosolve acetate, methyl Cellosolve, ethylene dichloride, tetrachloroethane, ethylene glycol monomethylether, ethylene glycol monoethylether acetate, an aqueous solution containing magnesium perchlorate, saturated aqueous urea solution, and so forth.

For polypeptide, concentrated zinc chloride, and lithium chloride can be used.

For polyvinyl chloride, the following swelling agents can be used as core liquid: dipropyl ketone, methyl amyl ketone, methyl isobutyl ketone, acetonylacetone, methyl ethyl ketone, dioxane, dichloromethane, acetic anhydride, aromatic amines. The core liquid described above can be used in the form of mixture with other water soluble organic solvent within the range that the core liquid does not show the gellation effect for the spun dope filament. The water soluble organic solvents are, for example, ethanol, methanol, acetone, dioxane, tetrahydrofuran, acetic acid, diethyl amine, glycerin, ethylene glycol, methyl Cellosolve, diglyme (bis(2)-methoxymethyl) ether, Carbitol, diethylene glycol, monoacetin and diacetin.

The following examples will present a more detailed description of this invention. Of course, this invention is not limited to the examples.

REFERENCE EXAMPLE NO. 1

Reference Examples will be described for the understanding of the effects of this invention. 23 parts of cellulose acetate (E-400-25, Eastman Kodak Co.) was dissolved in 77 parts of acetone to prepare a spinning solution. The spinning solution was extruded downward from the annular slit of a double pipe orifice substantially in the vertical direction. Water was ejected from the inner pipe of the double pipe orifice simultaneously. The inner pipe was concentrically positioned in the annular slit. Thus, a hollow fiber was produced in the conventional dry jet-wet spinning process. The spinning dope filament from the orifice was run through the gaseous space of 30 cm, and then it was introduced into a water bath (coagulating bath), where the filament was coagulated.

The coagulated spinning fiber was successively introduced to were washing bath, and then wound up.

Since the spun-dope was gelled immediately after extrusion from the orifice, the spinnability was very poor and the draft ratio was very low. The spinning filament was liable to break. The maximum spinning speed was 12 meters per min., even if experimental conditions were varied.

EXAMPLE NO. 1

The spinning solution and spinning apparatus were the same as those in the above Reference Example No. 1. In this example, DMSO was used as the core liquid, instead of water.

The spinnability was very good. The spinning was performed stably at the speed of 168 m/min. The maximum speed was 186 m/min. Breaking of the fiber was not observed during a spinning period of eight hours. The thickness of the resultant hollow fiber membrane was constant. The hollow fiber had a very uniform configuration.

EXAMPLE NO. 2

Acrylonitrile-methylacrylate copolymer (93:7) was dissolved into dimethylacetomide to prepare the spinning solution. A hollow fiber was spun in the dry jet-wet spinning, using the same apparatus as in the Example No. 1. Dimethylacetomide was used as the core liquid.

The fiber was very stably spun at the speed of 160 m/min. The resulting hollow fiber was satisfactorily uniform.

When water was used as core liquid for comparison, the spinnability was much deteriorated due to the gelling action of water, and the spinning speed was at most 10 m/min. When methanol was used as core liquid, the spinning speed was at most 13 m/min.

EXAMPLE NO. 3

The experimental conditions were the same as in the Example No. 2 except that 60% nitric acid was used as the core liquid. The spinning speed was 138 m/min. The spinning operation was stable. The produced hollow fiber was uniform.

EXAMPLE NO. 4

The experimental conditions were the same as in the Example No. 2 except that formamide was used as core liquid. The hollow fiber was stably spun at the high speed of 140 m/min. The cross section of the produced hollow fiber was close to true circle. The thickness of the hollow fiber was constant.

EXAMPLE NO. 5

Polyvinyl chloride was dissolved in dimethylformamide to prepare the spinning solution. The spinning solution was extruded from the annular slit of the double pipe orifice in the usual manner, and simultaneously dimethylformamide was ejected from the inner pipe. The hollow fiber was produced in the usual dry jet-wet spinning process.

The spinnability was excellent and the hollow fiber was produced at the speed of 170 m/min. The cross section of the resulting hollow fiber was true circle, and the thickness was constant.

When, for comparison, water was used as the core liquid under the same conditions, gellation of the spun dope was instantaneously developed immediately after spinning. The spinning speed was lowered to 9 m/min.

EXAMPLE NO. 6

The experimental conditions were the same as in Example No. 5 except that the mixture of tetrahydrofuran and water (volume ratio of 90:10) was used as core liquid.

The hollow fiber was stably spun at the high speed of 130 m/min. The cross section of the produced hollow fiber was true circle. The hollow fiber was a satisfactorily uniform.

EXAMPLE NO. 7

Polymethyl methacrylate was dissolved in acetone to prepare the spinning solution. The hollow fiber was spun in the same dry jet-wet spinning as in the Example No. 1. Acetic acid was used as core liquid. The hollow fiber was prepared at the high speed of 120 m/min. The produced hollow fiber was uniform, and its cross section was a true circle.

EXAMPLE NO. 8

Acrylonitrile-methylacrylate copolymer was dissolved in dimethylformamide to prepare the spinning solution. The spinning solution was extruded from the annular slit of the double pipe orifice. The hollow fiber was manufactured in the conventional wet spinning process in which the orifice was immersed in the coagulation bath. A 30% aqueous solution of dimethylformamide was used as the coagulating bath. Dimethylacetamide, dimethylsulfoxide and 60% nitric acid were used as core liquids for the respective experiments. The spinning speeds were 28 m/min, 29 m/min and 32 m/min for dimethylacetamide, dimethylsulfoxide and 60% nitric acid, respectively. These spinning speeds were surprisingly higher for the wetspinning of acrylonitrile copolmer.

When water was used as core liquid for comparison, the spinning speed was at most 12 m/min. The effect of this invention was thus distinctly proved. When ethanol was used as the core liquid, the spinning speed was at most 15 m/min.

EXAMPLE NO. 9

The experimental conditions were the same as in the Example No. 1 except that the mixture of dimethylsulfoxide and water (80:20) was used as core liquid.

The maximum spinning speed was 136 m/min. The hollow fiber thus produced was uniform, and its cross section was a true circle. The thickness of the hollow fiber membrane was constant.

REFERENCE EXAMPLE NO. 2

21 parts of cellulose acetate (E-400-25 by Eastman Kodak Co.) were dissolved into 79 parts of acetone to prepare the spinning solution. The hollow fiber was manufactured in the same manner as in the Reference Example No. 1, using the same apparatus.

Commercial ethanol was used as core liquid.

The maximum spinning speed was 70 m/min. The stability of the spinning filament was not satisfactory. The filament was liable to break during the experiment. The spinning speed had to be lower than 40 m/min to obtain the hollow fiber sample. Even at such a low speed, the spinning ability was not satisfactory, and the filament was often broken during the expreiment.

EXAMPLE NO. 10

The experimental conditions were the same as in the Reference Example No. 2 except that dimethylsulfoxide-ethanol (volume ratio of 85:15) was used as the core liquid.

The maximum spinning speed was raised to 160 m/min. The hollow fiber was stably spun at the speed of 120 m/min. The cross section of the resulting hollow fiber was nearly a true circle. The hollow fiber was dimensionally uniform. The thickness of the hollow fiber membrane was constant.

EXAMPLE No. 11

The experimental conditions were the same as in the Example No. 10 except that dimethylsulfoxide-ethanol (10:90) was used as core liquid.

The maximum spinning speed was found to be 138 m/min. The filament was taken up stably at the speed of 100 m/min, and no breakage was observed during the spinning experiment.

REFERENCE EXAMPLE NO. 3

A cellulose acetate (E-400-25 manufactured by Eastman Kodak Co.) was disolved into the mixture of acetone and formamide (40:60) to prepare the spinning solution. The concentration of the cellulose acetate was 28%. The spinning apparatus was the same as in the Reference Example No. 1. Water was used as core liquid.

The maximum spinning speed was only 17 m/min. The spinnability was not satisfactory and the draft ratio was very low in this example.

EXAMPLE NO. 12

The experimental conditions were the same as in the Reference Example No. 3 except that DMSO was used as core liquid.

According to this Example, the spinnability or the thread-forming property was surprisingly improved. The maximum spinning speed was raised to 183 m/min. The spun filament never cut at the spinning speed of 160 m/min at which the sample of the hollow fiber was obtained. The cross section of the resultant hollow fiber was close to a true circle. The thickness of the hollow fiber membrane was constant.

REFERENCE EXAMPLE NO. 4

The experimental conditions were the same as in Example No. 12 except that methanol was used as the core liquid. The maximum spinning speed was 41 m/min in this example, and the fiber frequently broke at the sampling spinning speed of 22 m/min.

EXAMPLE NO. 13

The hollow fiber of cellulose acetate was produced in the same manner as in the Reference Example No. 4. In this example, the composite of dimethylsulfoxide-methanol (40:60) was used as core liquid.

The hollow fiber was stably spun and never broke at the spinning speed of 120 m/min. The cross section of the produced hollow fiber was a true circle. The thickness of the hollow fiber membrane was satisfactorily uniform.

EXAMPLE NO. 14

The same cellulose acetate as that in the Reference Example No. 1, was used for spinning solution. The spinning solution was composed of 69 parts of acetone, 23 parts of cellulose acetate, 6.1 parts of water, 1.6 parts of magnesium perchlorate and 0.3 parts of hydrochloric acid. The double pipe orifice was used for spinning in the same manner as in the Reference Example No. 1. In this Example, a mixture of dimethylsulfoxide and glycerine (90:10) was used as the core liquid.

The spinning filament was stably spun at the spinning speed of 140 m/min. A hollow fiber having a cross sections of a true circle was obtained.

While the mixture of water and glycerine (90:10) was used as core liquid for comparison, the thread forming property and spinnability were remarkably deteriorated. The upper limit of the sampling spinning speed was at most 12 m/min.

EXAMPLE NO. 15

A cuprammonium cellulose solution (cellulose 10.0%, ammonia 7.0%, Cu 3.6%) was prepared in a usual manner as spinning solution. Using the same apparatus as in Example No. 1, hollow fiber having an outer diameter of $100\mu$, and an inner diameter $60\mu$ was stably produced at the spinning speed of 120 m/min. using the cuprammonium solution (ammonia 7.0%, Cu 3.6%) as core liquid.

The spinning procedure was dry jet-wet spinning. Thus, the spun-filament was introduced into aqueous NaOH solution (11%) after the filament had been run the air space of 300 mm. The filament was then successively introduced into a 5% sulfuric acid aqueous solution. Then it was washed and plasticized with glycerin. A hollow cellulose fiber with uniform membrane thickness was obtained. The cross-section of the fiber was found to be a true circle.

When water was used as core liquid, spinnability was lowered, and breakage of the spun-filament was often observed. Maximum spinning speed was down to 53 m/min.

EXAMPLE NO. 16

Polyacrylonitrile ($n=1.6$ in DMF at 30° C.) was dissolved in 65% nitric acid aqueous solution at $-5°$ C. to prepare a spinning solution having polyacrylonitrile concentration of 15%. Using the 50% aqueous nitric acid as core liquid, hollow fibers were prepared using dry jet-wet spinning. The spinnability was excellent and maximum speed was 165 m/min.

When the core liquid was replaced with water, a water bath was used as coagulated bath. The coagulant was successively washed with water and after the core liquid was removed by cutting the filament at appropriate length, the hollow fiber was again washed and plasticized with glycerin and dried.

When water was used as core liquid, the spinnability suddenly became poor and maximum spinning speed was down to 9 m/min.

EXAMPLE NO. 17

The copolymer as acrylonitrile-methylacrylate (93:7) was used in the spinning solution.

In this example, 70% nitric acid was used as spinning dope solvent. The apparatus and the method of spinning were the same as in example No. 16. As core liquid, 40% aqueous nitric acid was used.

Spinnability was excellent and maximum spinning speed was 158 m/min.

When the core liquid was replaced with water, spinnability was lowered rapidly, and maximum spinning speed was only 8 m/min. The 10% aqueous nitric acid was tried as core liquid. In this case, the maximum spinning speed was 18 m/min. To obtain a spinning speed higher than 50 m/min, at least 30% of nitric acid was necessary in the core liquid.

EXAMPLE NO. 18

Polyvinylchloride (PVC) ($\eta=12.1$ in DMF at 30° C.) was dissolved in DMF to prepare a spinning solution (23% PVC).

In the usual dry jet-wet spinning method, the hollow fiber was produced by using DMF-Ethanol mixture (80:20) as core liquid. Spinnability was excellent and maximum spinning speed was 186 m/min. When water was used as core liquid, the maximum spinning speed was down to only 7 m/min, because of the gellation effect of the core water.

EXAMPLE NO. 19

The polyvinylchloride used in the Example No. 18 was dissolved in cyclohexanone to prepare 18% spinning solution. Apparatus and the spinning procedure were the same except that tetrahydrofuran-methanol mixture (50:50) was used as core liquid. In this example, maximum spinning speed was 178 m/min. and the spinning could be carried out without any trouble at the spinning speed of 150 m/min.

EXAMPLE NO. 20

Polymethylmethacrylate was dissolved in acetone to prepare a spinning dope and the hollow fiber was prepared in the same manner as in the Example No. 19 using a core liquid consisting of acetone and methanol (40:60).

The spinnability was excellent and maximum spinning speed was 167 m/min. When methanol was used as core liquid, spinnability became poor and maximum spinning speed was down to 21 m/min.

EXAMPLE NO. 21

The fibers obtained in the Reference Example Nos. 1 and 2, and the Example Nos. 1, 9, 10 and 11 were hydrolized with 1% sodium hydroxide aqueous solution, to regenerate cellulose hollow fibers. The dialysis efficienty of the regenerated hollow fibers was tested, using urea and vitamin $B_{12}$.

The outer diameter and inner diameter of the samples of the hollow fiber were 300 $\mu\pm3$ and 240 $\mu\pm10$, respectively. The cylindrical dialyzer of the artificial kidney type was assembled. The total membrane area of the hollow fibers in the cylindrical dialyzer was 10000 cm$^2$. Urea was dissolved in distilled water to obtain the 100 mg/dl of urea solution. The thus obtained urea solution was flowed as pseudo blood at the rate of 200 ml/min through the hollow portions of the hollow fibers in the dialyzer. Distilled water as dialysate was flowed at the rate of 500 ml/min. counter-currently, along outside the hollow fibers. The dialysis efficiency of the hollow fibers were determined together with the cellulose hollow fiber obtained in the Example No. 15. The removing rates of urea and vitamine $B_{12}$ are shown in Table I.

TABLE I

| Sample No. | Removing rate (%) | |
|---|---|---|
| | urea | Vitamine $B_{12}$ |
| Reference 1 | 61 | 7.8 |
| Example 1 | 82 | 25.0 |
| Example 9 | 80 | 23.6 |
| Reference 2 | 66 | 8.2 |
| Example 10 | 82 | 21.1 |
| Example 11 | 80 | 19.2 |
| Example 15 | 86 | 27.1 |

EXAMPLE NO. 22

The ultrafiltration coefficients of the hollow fibers obtained in the Reference Example Nos. 3 and 4, and the Example Nos. 12, 13, 14 and 16 were measured. The results are shown in Table II.

TABLE II

| Sample No. | Ultrafiltration (ml/m$^2$.hr.mmHg) |
|---|---|
| Reference 3 | 23 |
| Example 12 | 146 |
| Reference 4 | 21 |
| Example 13 | 138 |
| Example 14 | 126 |
| Example 16 | 129 |

While there has been described preferred embodiments of the invention, obviously further modifications and variations are possible in light of the above teachings. It is therefore to be understood that within the scope of the appended claims, the invention may be practised otherwise than as specifically described.

What is claimed is:

1. In a method of manufacturing a hollow fiber comprising the steps of:
   (a) extruding a spinning solution containing a high molecular weight compound in a concentration of 10 to 35% by weight from an annular slit, said high molecular weight compound consisting of one of cuprammonium cellulose, cellulose ester, polymethyl methacrylate and polyvinyl chloride;
   (b) simultaneously extruding a core liquid which consists of a low molecular weight compound which is easily mixed or compatible with said spinning solution and is substantially incapable of coagulating said high molecular weight compound, from an orifice encircled by said annular slit; and
   (c) introducing said extruded spinning solution with said core liquid into a coagulating bath containing water or mainly water, said spinning solution being coagulated in said coagulating bath, wherein the improvement comprises: selecting said core liquid from:
   (i) the group of solvents consisting of a dimethyl-sulfoxide-paraformaldehyde mixture, an aqueous cuprammonium solution and a mixture thereof for said cuprammonium cellulose;

(ii) the group of solvents consisting of acetone, methyl Cellosolve acetate, dimethylsulfoxide, dimethylformamide, dimethylacetamide, methylene chloride, 1,4-dioxane, diacetone alcohol, ethyl lactate, tetrahydrofuran, ethylformamide, methyl formate, and a mixture of at least two of said solvents for said cellulose ester;

(iii) the group of solvents consisting of acetone, toluene, acetic acid, formic acid, ethyl acetate and a mixture of at least two of these for said polymethyl methacrylate; and (iv) the group of solvents consisting of dimethylformamide, cyclohexanone, nitrobenzene, mesityl oxide, tetrahydrofuran and a mixture of at least two of said solvents for said polyvinyl chloride 2. In a method of manufacturing a hollow fiber comprising the steps of:

(a) extruding a spinning solution containing a high molecular weight compound in a concentration of 10 to 35% by weight from an annular slit, said high molecular weight compound consisting of a member selected from the group consisting of cuprammonium cellulose, cellulose ester, polymethyl methacrylate and polyvinyl chloride;

(b) simultaneously extruding a core liquid which is compatible with said spinning solution and is substantially incapable of coagulating it, from an orifice encircled by said annular slit; and (c) introducing said extruded spinning solution with said core liquid into a coagulating bath containing water or mainly water, said spinning solution being coagulated in said coagulating bath, wherein the improvement comprises: selecting said core liquid from:

(i) the group of solvents consisting of dimethylsulfoxide-paraformaldehyde mixture and aqueous cuprammonium solution for said cuprammonium cellulose;

(ii) the group of solvents consisting of acetone, methyl Cellosolve acetate, dimethylsulfoxide, dimethylformamide, dimethylacetamide, methylene chloride, 1,4-dioxane, diacetone alcohol, ethyl lactate, tetrahydrofuran, ethylformamide and methyl formate for said cellulose ester;

(iii) the group of solvents consisting of acetone, toluene, acetic acid, formic acid and ethyl acetate for said polymethyl methacrylate; and (iv) the group of solvents consisting of dimethylformamide, cyclohexanone, nitrobenzene, mesityl oxide, tetrahydrofuran.

3. In a method of manufacturing a hollow fiber comprising the steps of:

(a) extruding a spinning solution containing a high molecular weight compound in a concentration of 10 to 35% by weight from an annular slit, said high molecular weight compound consisting of one of cellulose ester and polyvinyl chloride;

(b) simultaneously extruding a core liquid which consists of a low molecular weight compound which is easily mixed or compatible with said spinning solution and is substantially incapable of coagulating said high molecular weight compound, from an orifice encircled by said annular slit; and (c) introducing said extruded spinning solution with said core liquid into a coagulating bath containing water or mainly water, said spinning solution being coagulated in said coagulating bath;

wherein the improvement comprises:

selecting said core liquid from:

(i) the group of solvents consisting of acetone, methyl Cellosolve acetate, dimethylsulfoxide, dimethylformamide, dimethylacetamide, methylene chloride, 1,4-dioxane, diacetone alcohol, ethyl lactate, tetrahydrofuran, ethylformamide, methyl formate, and a mixture of at least two of said solvents, and the group of swelling agents consisting of methyl ethyl ketone, ethyl acetate, Cellosolve acetate, methyl Cellosolve, ethylene glycol, ethylene glycol monoethylether acetate, formamide, triethyl phosphate, hydrogen perchlorate, N-methyl-2-pyrrolidone, t-butanol, diacetin, monoacetin, 1,3 butanediol and a mixture of at least two of said swelling agents for said cellulose ester; and (ii) the group of solvents consisting of dimethyl formamide, cyclohexanone, nitrobenzene, mesityl oxide, tetrahydrofuran and a mixture of at least two of said solvents, and the group of swelling agents consisting of dipropyl ketone, methyl amyl ketone, methyl isobutyl ketone, acetonylacetone, methyl ethyl ketone, dioxane, dichloromethane, acetic anhydride and a mixture of at least two of said swelling agents for said polyvinyl chloride.

4. In a method of manufacturing a hollow fiber comprising the steps of:

(a) extruding a spinning solution containing a high molecular weight compound in a concentration of 10 to 35% by weight from an annular slit, said high molecular weight compound consisting of one of cellulose ester and polyvinyl chloride;

(b) simultaneously extruding a core liquid which consists of a low molecular weight compound which is easily mixed or compatible with said spinning solution and is substantially incapable of coagulating said high molecular weight compound, from an orifice encircled by said annular slit; and (c) introducing said extruded spinning solution with said core liquid into a coagulating bath containing water or mainly water, said spinning solution being coagulated in said coagulating bath;

wherein the improvement comprises:

selecting said core liquid from:

(i) the group of swelling agents consisting of methyl ethyl ketone, ethyl acetate, Cellosolve acetate, methyl Cellosolve, ethylene glycol, ethylene glycol monoethylether acetate, formamide, triethyl phosphate, hydrogen perchlorate, N-methyl-2-pyrrolidone, t-butanol, diacetin, monacetin, 1,3 butanediol and a mixture of at least two of said swelling agents for said cellulose ester; and (ii) the group of swelling agents consisting of dipropyl ketone, methyl amyl ketone, methyl isobutyl ketone, acetonylacetone, methyl ethyl ketone, dioxane, dichloromethane, acetic anhydride and a mixture of at least two of said swelling agents for said polyvinyl chloride.

5. In a method of manufacturing a hollow fiber comprising the steps of:

(a) extruding a spinning solution containing a high molecular weight compound in a concentration of 10 to 35% by weight from an annular slit, said high molecular weight compound consisting of a member selected from the group consisting of cellulose ester and polyvinyl chloride;

(b) simultaneously extruding a core liquid which is compatible with said spinning solution and is substantially incapable of coagulating it, from an orifice encircled by said annular slit; and (c) introducing said extruded spinning solution with said core liquid into a coagulating bath containing water or mainly water, said spinning solution being coagulated in said coagulating bath;

wherein the improvement comprises:

selecting said core liquid from:

(i) the group of solvents consisting of acetone, methyl Cellosolve acetate, dimethylsulfoxide, dimethylformamide, dimethylacetamide, methylene chloride, 1,4-dioxane, diacetone alcohol, ethyl lactate, tetrahydrofuran, ethylformamide and methyl formate, and the group of swelling agents consisting of methyl ethyl ketone, ethyl acetate, Cellosolve acetate, methyl Cellosolve, ethylene glycol, ethylene glycol monoethylether acetate, formamide, triethyl phosphate, N-methyl-2-pyrrolidone, t-butanol, diacetin, monoacetin and 1,3 butanediol for cellulose ester; and (ii) the group of solvents consisting of dimethylformamide, cyclohexanone, nitrobenzene, mesityl oxide, tetrahydrofuran and the group of swelling agents consisting of dipropyl ketone, methyl amyl ketone, methyl isobutyl ketone, acetonylacetone, methyl ethyl ketone, dioxane, dichloromethane and acetic anhydride for said polyvinyl chloride.

6. In a method of manufacturing a hollow fiber comprising the steps of:

(a) extruding a spinning solution containing a high molecular weight compound in a concentration of 10 to 35% by weight from an annular slit, said high molecular weight compound consisting of a member selected from the group consisting of cellulose ester and polyvinyl chloride;

(b) simultaneously extruding a core liquid which is compatible with said spinning solution and is substantially incapable of coagulating it, from an orifice encircled by said annular slit; and (c) introducing said extruded spinning solution with said core liquid into a coagulating bath containing water or mainly water, said spinning solution being coagulated in said coagulating bath;

wherein the improvement comprises:

selecting said core liquid from:

(i) the group of swelling agents consisting of methyl ethyl ketone, ethyl acetate, Cellosolve acetate, methyl Cellosolve, ethylene glycol, ethylene glycol monoethylether acetate, formamide, triethyl phosphate, N-methyl-2-pyrrolidone, t-butanol, diacetin, monoacetin and 1,3 butanediol for said cellulose ester; and (ii) the group of swelling agents consisting of dipropyl ketone, methyl amyl ketone, methyl isobutyl ketone, acetonylacetone, methyl ethyl ketone, dioxane, dichloromethane and acetic anhydride for said polyvinyl chloride.

7. A method according to any one of claims 1, 2 and 3-6 in which said spinning solution and said core liquid run through a predetermined space for 0.01 to 5 seconds after being extruded from the annular slit and the orifice, and are then introduced into the coagulating bath.

8. A method according to any one of claims 1, 2 and 3-6 in which a dimethylsulfoxide-paraformaldehyde mixture is used as the core liquid for cuprammonium cellulose.

9. A method according to any one of claims 1, 2 and 3-6 in which aqueous cuprammonium solution is the core liquid and the spinning solution is an aqueous cuprammonium solution of said cuprammonium cellulose.

10. A method according to any one of claims 1, 2 and 3-6 in which said cellulose ester is at least one of cellulose acetate, cellulose butyrate, cellulose propionate, cellulose acetate butyrate and cellulose acetate propionate.

11. A method according to claim 10 in which said cellulose ester is cellulose acetate and the degree of acetylation of said cellulose acetate is 30% to 65%.

12. A method according to any one of claims 1, 2 and 3-6 in which an organic swelling liquid in an amount of 5 to 65% is added to said spinning solution.

13. A method according to claim 12 in which said organic swelling agent added to the spinning solution of a cellulose ester is at least one member selected from the group consisting of N,N-dimethylformamide, formamide, urea, triethyl phosphate, N-methyl-2-pyrrolidone, t-butanol, 1,3 butanediol, diacetin, and monoacetin.

14. A method according to any one of claims 1, 2 and 3-6 in which said high molecular weight compound is said cellulose ester, and hydrogen perchlorate in an amount of 1 to 30% is added to said spinning solution.

15. A method according to any one of claims 1, 2 and 3-6 in which said extruded spinning solution with the core liquid passes through a dry-passage of 5 to 100 cm before being introduced into the coagulating bath, said spinning solution having a viscosity of 200 to 2000 poises.

16. A method according to claim 15 in which: (a) the high molecular weight compound is cellulose acetate having a degree of esterification of 30 to 65%, and (b) the core liquid is a mixture of dimethylsulfoxide and water (80:20).

17. A method according to any one of claims 3-6 in which the swelling degree, SWD, of said swelling liquid, represented by the following equation, is more than 5:

$$SWD = (Ws - Wo)/Wo \times 100,$$

wherein Wo represents the weight of a film sample of high molecular weight compound of 5 cm × 5 cm square and 0.5 mm thick, and Ws represents the weight of the film sample after it has been immersed in said swelling liquid of 25° C. for 24 hours, and the swelling liquid has been removed from the surface of the film with the filter paper.

18. A method according to claim 17 in which the swelling degree SWD of said swelling liquid is more than 10.

19. A method according to claim 18 in which the swelling degree SWD of said swelling liquid is more than 15.

* * * * *